July 3, 1934.    M. G. ROBINSON    1,965,357
HOLLOW FLANGED BODY PORTION

Filed Feb. 3, 1934

Inventor:
Manuel G. Robinson,
by Harry E. Dunham
His Attorney.

UNITED STATES PATENT OFFICE 1,965,357

HOLLOW FLANGED BODY PORTION

Manuel G. Robinson, Lynn, Mass., assignor to General Electric Company, a corporation of New York Application February 3, 1934, Serial No. 709,673

3 Claims. (Cl. 137—76)

The present invention relates to hollow bodies having flanged portions, such as conduits and containers, for example, transformer tanks, which have a portion provided with a flange for fastening a cover or a similar body thereto. Owing to the flanged portions projecting outwardly from the tanks or bodies, difficulties are experienced where such flanged bodies have to be moved through, or confined within, a limited space, for example, where a transformer tank having a flanged opening for supporting a cover has to be moved through a door.

The object of the present invention is to provide an improved construction and arrangement for a flanged body to overcome the above mentioned difficulties.

For a consideration of what I believe to be novel and my invention, attention is directed to the following specification and the claims appended thereto.

Figure 1:
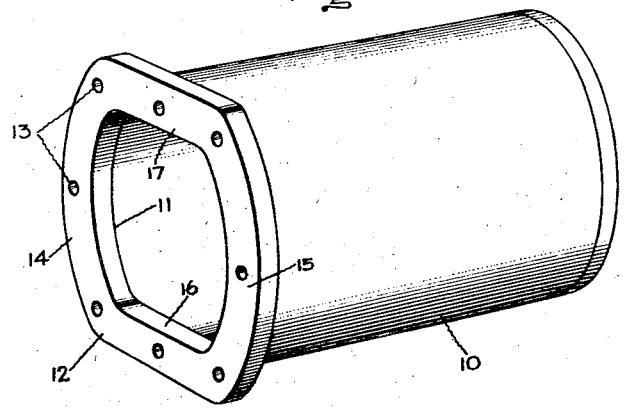
Figure 2:
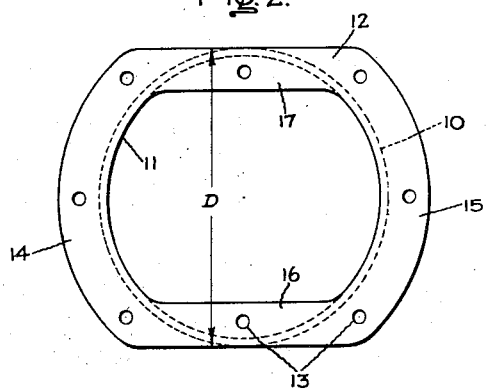

In the accompanying drawing I have shown in Fig. 1 a perspective view of a flanged body according to my invention, and in Fig. 2 a front view of the flanged body portion.

The flanged body comprises a body proper which may be a conduit or a container 10 having an end portion 11 provided with a flange 12. The latter has a plurality of bores 13 for receiving bolts or the like to hold a cover or a similar flanged body.

The flange according to my invention comprises diametrically opposite portions 14 and 15 projecting radially outward from the body 10, and other portions 16 and 17 transverse to the portions 14, 15 projecting radially inward towards the hollow space defined by the body. As can be clearly seen from Fig. 2 of the drawing, the maximum diameter D of the inwardly projecting flange portions 16 and 17 is equal to the diameter of the body. In the present instance the body has been indicated as being circular in which case the width or diameter D of the flange is equal to the outer diameter of the body. If the body were elliptical or of other shape, the maximum diameter of the inwardly flanged portions would be preferably made equal to the minimum diameter of the flanged body portion. The flanged portions 14, 15, 16, 17 form a continuous surface which permits proper seating and application of a packing in case leakage of fluid has to be prevented.

From another viewpoint, the flange according to my invention comprises outwardly projecting ears 14 and 15 and inwardly projecting ears 16 and 17. These ears are arranged so that the body can be moved through a door or into a space having a width of the order of the width or diameter of the body proper. Thus, with my invention I have accomplished an improved construction for flanged bodies which is simple and considerably reduces the overall dimensions of the body. This is advantageous in many cases not only because this type of flange permits placing of a flanged body in a smaller space but also because it permits the provision of a smaller space for containing such flanged body, resulting in a saving of floor space.

What I claim as new and desire to secure by Letters Patent of the United States is:

1. A hollow flanged body having a flange comprising portions projecting radially away from the body and other portions projecting radially inward into the body, each portion having a bore for receiving a bolt.

2. A hollow flanged body having a flange comprising portions projecting radially away from the body and other portions projecting radially inward into the body, each portion having a bore for receiving a bolt, the inwardly projecting portions being located at substantially diametrically opposite sides of the body to reduce the diameter of the flange to the smallest diameter of the flanged body portion.

3. An annular hollow body having a flanged portion defining a continuous seating surface for a packing, diametrically opposite portions of the flange projecting outward from the body and transverse portions of the flange projecting inward into the hollow space of the body to confine the diameter of the transverse portion of the flange to the minimum diameter of the body.

MANUEL G. ROBINSON.